(12) United States Patent  (10) Patent No.: US 8,348,315 B2
Morris, I  (45) Date of Patent: Jan. 8, 2013

(54) CAT LITTER SCOOP

(76) Inventor: Elva Janese Morris, I, Mildenhall (GB)

( * ) Notice: Subject to any disclaimer, the term of this patent is extended or adjusted under 35 U.S.C. 154(b) by 0 days.

(21) Appl. No.: 13/008,933

(22) Filed: Jan. 19, 2011

(65) Prior Publication Data

US 2011/0233948 A1  Sep. 29, 2011

(51) Int. Cl.
*A01K 29/00* (2006.01)
(52) U.S. Cl. .......................................... 294/1.3; 294/179
(58) Field of Classification Search .................. 209/418, 209/419; 294/1.3, 1.4, 1.5, 179; 119/166
See application file for complete search history.

(56) References Cited

U.S. PATENT DOCUMENTS

| | | | |
|---|---|---|---|
| 3,854,578 A | 12/1974 | Sharpe | |
| 5,190,326 A * | 3/1993 | Nunn | 294/1.3 |
| 5,238,277 A | 8/1993 | Robinson | |
| 5,741,036 A | 4/1998 | Ring | |
| 7,047,907 B1 * | 5/2006 | Johnston | 119/867 |
| 2006/0156991 A1 | 7/2006 | Burns | |
| 2007/0277741 A1 * | 12/2007 | Delman et al. | 119/166 |
| 2008/0116704 A1 * | 5/2008 | Botello et al. | 294/1.5 |

* cited by examiner

*Primary Examiner* — Saul Rodriguez
*Assistant Examiner* — Gabriela Puig
(74) *Attorney, Agent, or Firm* — Timothy M. Barlow

(57) ABSTRACT

A cat litter scoop has a handle part and a scoop part. The handle part includes a releasable locking mechanism and a button for releasing the locking mechanism. The scoop part is connected to the handle part via the releasable locking mechanism. When the scoop part is soiled, such as after scooping cat litter, a user presses the button to release the locking mechanism and jettison the scoop part and the user has no contact with the cat litter and no contact with the soiled scoop part. Preferably, the scoop part is biodegradable and may include paper pulp.

4 Claims, 2 Drawing Sheets

CAT LITTER SCOOP

RELATED APPLICATIONS

This is a continuation application which claims priority of the British patent application GB 10 04 871 filed on 24 Mar. 2010, which is fully incorporated herewith by reference.

FIELD OF INVENTION

This invention relates to a cat litter scoop, and in particular a cat litter scoop in which the scoop part may be ejected from the handle part without any contact with the user, and in which the scoop part is biodegradable.

BACKGROUND OF THE INVENTION

Litter scoops that have a sifting part attached to a handle are well-known (see for example US2006/0156991, U.S. Pat. No. 5,238,277, U.S. Pat. No. 5,741,036. Similar devices having disposable elements are also known. U.S. Pat. No. 7,047,907 discloses a removable liner is provided that lines the head section of the scoop structure. The liner defines a plurality of slots that orient atop the openings in the head section of the scoop structure. As a result, when the scoop structure is used to scoop solid waste, only the liner comes into physical contact with the solid waste and becomes soiled. The soiled liner can then be disposed with the solid waste and a new liner attached to the scoop structure. The scoop structure can therefore be kept clean without the need for repeated washings.

However the part disposed of is relatively large, requires the underlying frame structure to support it in use, and the frame is likely to become at least partially contaminated. US2007/0277741 discloses a waste/debris removal scoop having a replaceable head and a frame capable of receiving the replaceable head is disclosed. The frame receives the replaceable head and holds the head into place by way of a snap feature comprising tabs. The tabs allow for the replaceable head to be snapped on or off as the user desires. Snapping off the used head potentially exposes the user to contamination by cat feces.

SUMMARY OF INVENTION

From the foregoing, it may be appreciated that a need has arisen for a cat litter scoop which has a biodegradable disposable head that is easily jettisoned by the user after use, and eliminates any contact between the cat feces, such as would be on the soiled scoop, and the scoop user.

The handle part of the scoop has a housing formed by a first and second casing, and the housing has a slot for the scoop part. A locking clip has a pivot and is held in position by a compression spring at one end, and the button at the other end. When the user presses the scoop part into the slot the locking clip pivots against the spring and locks the scoop part in place, and when the user presses the button the locking clip pivots against the spring and the scoop part is released.

BRIEF DESCRIPTION OF DRAWINGS

For a more complete explanation of the present invention and the technical advantages thereof, reference is now made to the following description and the accompanying drawings in which.

BEST MODE FOR CARRYING OUT THE INVENTION

Figure 1:
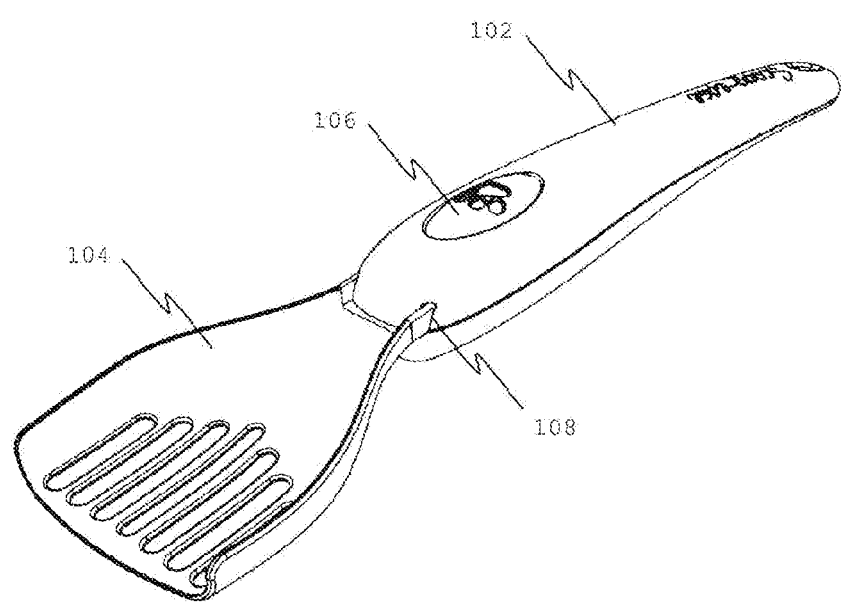
FIG. 1 illustrates a eat litter scoop of the present invention.
Figure 2:
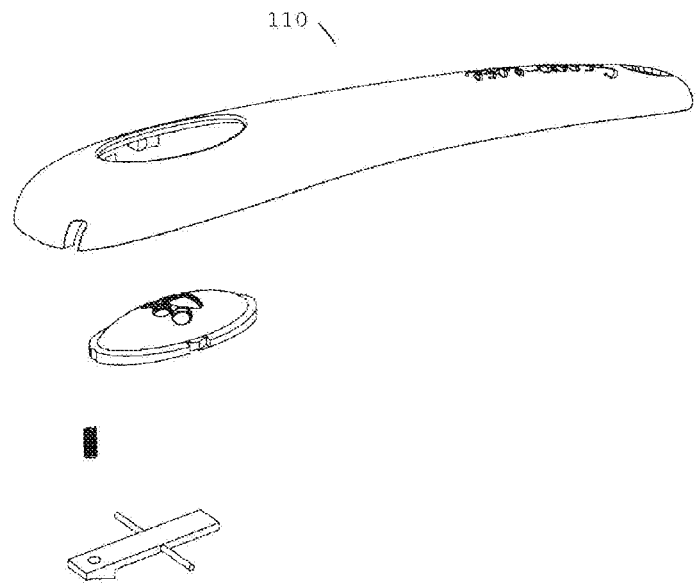
FIG. 2 illustrates the component parts of a cat litter scoop of the present invention.
Figure 2:
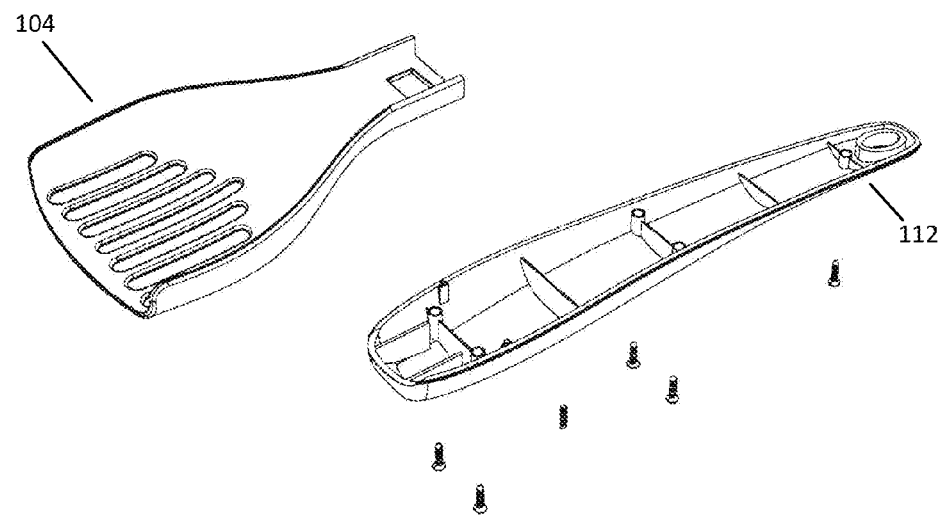
Figure 3:
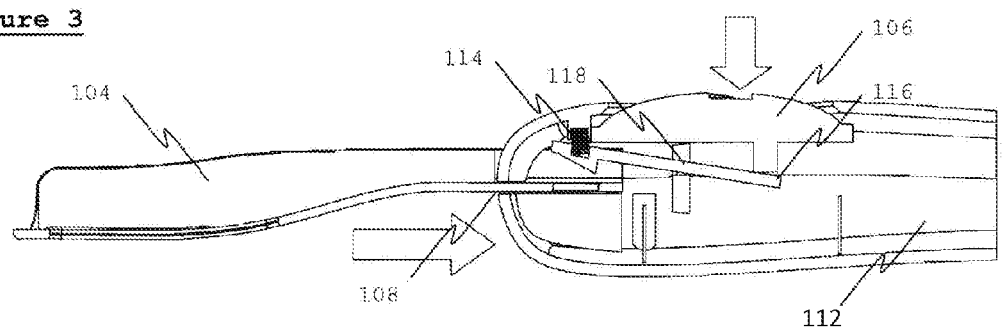
FIG. 3 illustrates the insertion of the scoop part of the invention into the handle part of the invention.

Embodiments of the present invention and their technical advantages may be better understood by referring to FIGS. 1-3.

Referring now to FIG. 1, which shows a cat litter scoop, a handle part (102) is slotted into a scoop part (104). The handle part includes a releasable locking mechanism and a button (100 for releasing the locking mechanism. The scoop part is connected to the handle part b means of the releasable locking mechanism. After scooping cat litter a user presses the button to release the locking mechanism and jettison the scoop part and the user has no contact with the cat litter.

Referring now to FIG. 2, which shows the component parts of a cat litter scoop, the handle part of the scoop has a housing formed by a first (110) and second casing (112), and the housing has a slot (108) for the scoop past A locking clip (116) has a pivot (118) and is held in position by a compression spring (114) at one end, and the button at the other end.

Referring now to FIG. 3, which shows the insertion of the scoop part into the handle part, as the user presses the scoop part into the slot in the direction of the arrow, the locking clip pivots against the spring and locks the scoop part in place. When the user presses the button in the direction of the arrow, the locking clip pivots against the spring and the scoop part is released.

Preferably the scoop part is biodegradable, and includes, for example, paper pulp. The scoops are supplied to the user in stacks.

What is claimed is:

1. A cat litter scoop including a handle part and a scoop part which are linerless, characterized in that the handle part includes a releasable locking mechanism and a button for releasing the locking mechanism; further characterized in that the scoop part is connected to the handle part by means of the releasable locking mechanism, wherein the scoop part is self-supporting, and wherein the releasable locking mechanism of the handle part provides the sole point of contact and support of the scoop part; wherein the handle part includes
   (a) a first casing;
   (b) a second casing attached to the first casing to form a housing having a slot for the scoop part;
   (c) a button;
   (d) a locking spring; and
   (e) a locking clip having a pivot, the locking clip held in position between the button and the locking spring via the pivot; whereby when the user presses the scoop part into the slot the locking clip pivots against the spring and locks the scoop part in place, and when the user presses the button the locking clip pivots against the spring and the scoop part is released, whereby after scooping cat litter a user presses the button to release the locking mechanism and jettison the soiled scoop part; whereby the user has no contact with the cat litter and no contact with the soiled scoop part.

2. The cat litter scoop of claim l in which the scoop part is biodegradable.

3. The cat litter scoop of claim 2 in which the scoop part includes paper pulp.

4. A cat litter scoop part for use with a cat litter scoop including a handle part, the handle part including a releasable locking mechanism and a button for releasing the locking mechanism: characterized in that the scoop part is biodegradable; further characterized in that the scoop part is connected to the handle part by means of the releasable locking mechanism, wherein the scoop part is self-supporting, and wherein the releasable locking mechanism of the handle part provides the sole point of contact and support of the scoop part, the handle part including (a) a first casing;
(b) a second casing attached to the first casing to form a housing having a slot for the scoop part;
(c) a button;
(d) a locking spring;
(e) a locking clip having a pivot the locking clip held in position between the button and the locking spring via the pivot; whereby when the user presses the scoop part into the slot the locking clip pivots against the spring and locks the scoop part in place, and when the user presses the button the locking clip pivots against the spring and the scoop part is released; whereby after scooping cat litter a user presses the button to release the locking mechanism and jettison the soiled scoop part; whereby the user has no contact with the cat litter and no contact with the soiled scoop part.

* * * * *